United States Patent [19]

Onishi et al.

[11] Patent Number: 5,032,331
[45] Date of Patent: Jul. 16, 1991

[54] METHOD FOR PRODUCTION OF HYDROPHILIC POROUS MEMBRANE OF POLYVINYLIDENE FLUORIDE

[75] Inventors: Makoto Onishi; Yukio Seita; Noriyuki Koyama, all of Fuji, Japan

[73] Assignee: Terumo Kabushiki Kaisha, Tokyo, Japan

[21] Appl. No.: 484,838

[22] Filed: Feb. 26, 1990

Related U.S. Application Data

[62] Division of Ser. No. 391,516, Jul. 12, 1989.

[30] Foreign Application Priority Data

Jul. 12, 1987 [JP] Japan .................................. 62-4638
Jul. 12, 1989 [WO] World Int. Prop. O. ..................... PCT/JP88/00019

[51] Int. Cl.$^5$ ................................................ B29C 67/20
[52] U.S. Cl. .................................... 264/48; 264/41; 264/232; 264/340; 210/500.42
[58] Field of Search .............. 204/296; 525/200, 366; 526/344; 521/27, 31; 264/48, 41, 232, 340; 210/500.42

[56] References Cited

U.S. PATENT DOCUMENTS

4,189,369  2/1980  Fang ........................ 204/296
4,774,132  9/1988  Joffe et al. .................. 428/290

FOREIGN PATENT DOCUMENTS

53-110680  9/1978  Japan .
56-16187   4/1981  Japan .
56-38333   4/1981  Japan .
57-131233  8/1982  Japan .
58-93734   6/1983  Japan .
59-206440  11/1984 Japan .
62-97611   5/1987  Japan .
62-267340  11/1987 Japan .
2058802    4/1981  United Kingdom .

OTHER PUBLICATIONS

Kise et al., Journal of Polymer Science, Polymer Chemistry Ed., vol. 21, pp. 3443-3451, 1983.

*Primary Examiner*—Hubert C. Lorin
*Attorney, Agent, or Firm*—Burns, Doane, Swecker & Mathis

[57] ABSTRACT

A method for the production of a hydrophilic porous membrane of polyvinylidene fluoride excelling in perviousness to water and other various properties and enjoying high commercial value, having uniform hydrohilicity imparted to the surface of pores therein, which porous membrane is characterized by the fact that the reflection spectrum thereof in the visible zone is substantially unchanged from that which existed before the treatment for impartation of hydrophilcity. The method for the production of the hydrophilic porous membrane is characterized by chemically treating the porous membrane is a strong alkali solution containing an oxidizing agent.

7 Claims, 2 Drawing Sheets

METHOD FOR PRODUCTION OF HYDROPHILIC POROUS MEMBRANE OF POLYVINYLIDENE FLUORIDE

This application is a divisional of application Ser. No. 391,516 of PCT/JP88/00019, filed July 12, 1989.

DESCRIPTION

2. Technical Field

This invention relates to a hydrophilic porous membrane of polyvinylidene fluoride and a method for the production thereof and more particularly to a hydrophilic porous membrane of polyvinylidene fluoride having the surface of pores therein undergone a chemical treatment for impartation of hydrophilicity and a method for the production thereof.

2. Background Art

Heretofore, porous membranes of cellulose derivatives of high perviousness to water, particularly cellulose acetate, have been generally utilized as hydrophilic porous membranes for various forms of filtration and dialysis. Since these cellulose derivatives are deficient in resistance to $\gamma$ ray, the conventional porous membranes are not usable in the field of medical treatments necessitating sterilization with $\gamma$ ray. Further, since the cellulose derivatives exhibit poor resistance to such industrial chemicals as acids, alkalies, and organic solvents, the porous membranes have been used under heavily restricted conditions.

To take the place of these porous membranes of cellulose derivatives, porous membranes using as the raw material therefor such fluorine type polymers as polyvinylidene fluoride and ethylene tetrafluoride and consequently excelling in resistance to chemicals and resistance to $\gamma$ ray have been developed. Since these new porous membranes are hydrophobic, they must undergo a treatment for impartation of hydrophilicity to be effectively used as separation membranes in aqueous type solutions.

As means of treatment for effecting this impartation of hydrophilicity, the method which resorts to the organic solvent (alcohol)-water displacement and the method which relies on coating the surface of pores in the membrane with a surfactant or a hydorphilic polymer have been heretofore known to the art. The former method has a disadvantage that the membrane vested with hydrophilicity by the treatment is wholly deprived of the acquired hydrophilicity once it is dried and the latter method has a disadvantage that the compound deposited by the coating treatment is exuded while the membrane is in use. A method which comprises impregnating a hydrophobic porous membrane with an alcohol, treating the impregnated membrane with an aqueous water-soluble polymer solution, drying the treated membrane, and cross-linking and insolubilizing the residual water-soluble polymer deposited on the surface of pores in the membrane by a heat treatment or an acetalizing treatment (Japanese Patent Publication SHO 56(1981)-16,187) and a method which effects the insolubilization of the deposited water-soluble polymer as by means of ionizing radiation (Japanese patent Publications SHO 56(1981)-16,187 and SHO 56(1981)-38,333) have been further developed. These methods not only share a common drawback that the treatments involved are highly complicated in process but also entail various drawbacks such as exudation of the portion of the polymer which has escaped insolubilization and decomposition and exudation of the deposited hydrophilic compound during the course of sterilization with the $\gamma$ ray.

Other chemical treatments with industrial chemicals are now being studied for feasibility. As things stand now, however, no practicable method for chemical treatment has yet been established because polyvinylidene fluoride has high resistance to chemicals and because the membrane possesses a special shape of porous texture. It has been known that polyvinylidene fluoride, in a solution of a strong alkali such as potassium hydroxide or sodium hydroxide, undergoes removal of hydrofluoric acid and consequently give rise mainly to a double bond in the molecular unit thereof and entail assumption of a brown color or black color (Journal of Polymer Science, Polymer Chemistry Edition, 21, 3443-3451 (1983)). An idea of imparting hydrophilicity to the polyvinylidene fluoride which has assumed the brown color or black color and incorporated the double bond in the molecular unit thereof by treating the polymer with sulfuric acid has been conceived [Glossary of Manuscripts for Presentation, Japan Polymer Society, Vol. 33, No. 3 (1984)]. This method, however, has as critical drawback that the polymer undergoes a notable loss of strength due to oxidative decomposition of the main chain thereof and the porous membrane managed to be produced at all assumes a brown color. A method of introducing a polar group into the double bond in the molecular unit of the polymer by subjecting to an oxidizing treatment the membrane which has been deprived of hydrofluoric acid in the strong alkali solution is also conceivable. This method, however, entails a disadvantage that the treatment grows in complexity of operation owing to inevitable addition of an extra work and the treatment, when performed under conditions necessary for impartation of thorough hydrophilicity to the surface of pores in the porous membrane, deprives the membrane of strength to a great extent and causes the membrane to turn brown owing to the surviving double bond. All these drawbacks occur because the objects of these treatments invariably have a special form of "porous membrane." If the chemical treatment is carried out with an increased intensity enough for the treatment to proceed even to the interior of the substrate, the double bond formed inside the substrate is not easily subjected to the oxidizing treatment in the second step, with the result that the membrane is caused to turn brown and incur impairment of physical properties. If the chemical treatment is carried out to a lesser extent, it is incapable of thorough impartation of hydrophilicity and consequent fulfillment of the object of the treatment.

In the circumstances, the hydrophilic porous membranes of polyvinylidene fluoride which have reached the practicable level and introduced to the market are colored in brown and, for use in medical treatments, suffer from deficiency in commercial image.

An object of this invention, therefore, is to provide a novel hydrophilic porous membrane of polyvinylidene fluoride and method for the production thereof. Another object of this invention is to provide a hydrophilic porous membrane of polyvinylidene fluoride having hydrophilicity thoroughly and uniformly imparted therein, excelling in outward appearance, and exhibiting high resistance to $\gamma$ ray and chemicals and a method for the production thereof. A further object of this invention is to provide a hydrophilic porous membrane of polyvinylidene fluoride capable of easy and expedient manufacture and rich in commercial image and a method for the production thereof.

Disclosure of the Invention:

The objects described above are accomplished by a hydrophilic porous membrane of polyvinylidene fluoride having the surface of pores therein wasted with uniform hydrophilicity, which porous membrane is characterized by the fact that the reflection spectrum thereof in the visible zone is substantially unchanged from that which existed before the treatment.

This invention also discloses a hydrophilic porous membrane of polyvinylidene fluoride having the surface of pores therein vested with uniform hydrophilicity owing to introduction of a polar group onto the molecule of polyvinylidene fluoride by a chemical treatment with an oxidizing agent, which porous membrane is characterized by the fact that the reflection spectrum thereof in the visible zone is substantially unchanged from that which existed before the treatment. This invention further discloses a hydrophilic porous membrane of polyvinylidene fluoride which, in a dry state, assumes a white color or no color when viewed with human eyes.

The various objects described above are accomplished by a method for the production of a hydrophilic porous membrane of polyvinylidene fluoride, which method is characterized by forming a porous membrane of polyvinylidene fluoride, impregnating an aqueous type solvent into the pores of the porous membrane, and chemically treating the resultant impregnated porous membrane in a strong alkali solution containing an oxidizing agent.

This invention further discloses a method for the production of a hydrophilic porous membrane of polyvinylidene fluoride, wherein the aforementioned oxidizing agent is potassium permanganate. This invention also discloses a method for the production of a hydrophilic porous membrane of polyvinylidene fluoride, wherein the aforementioned oxidizing agent is potassium hydroxide or sodium hydroxide.

BEST MODE FOR CARRYING OUT THE INVENTION

Figure 1:
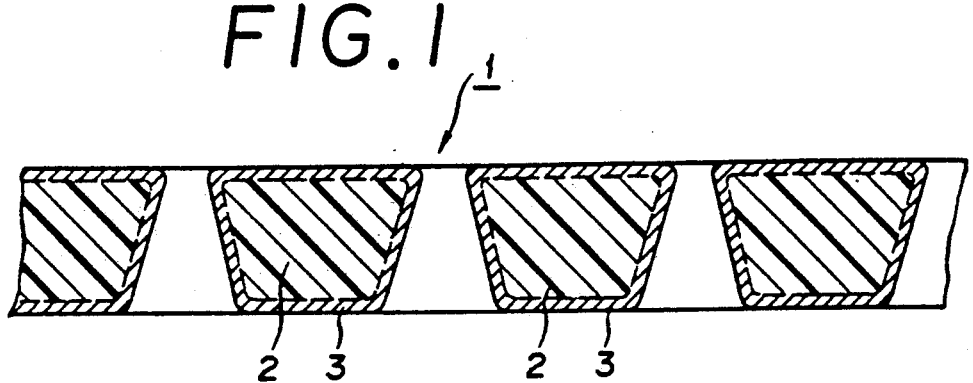
FIG. 1 is a magnified cross section illustrating in a model diagram a hydrophilic porous membrane of polyvinylidene fluoride of the present invention.
Figure 2:
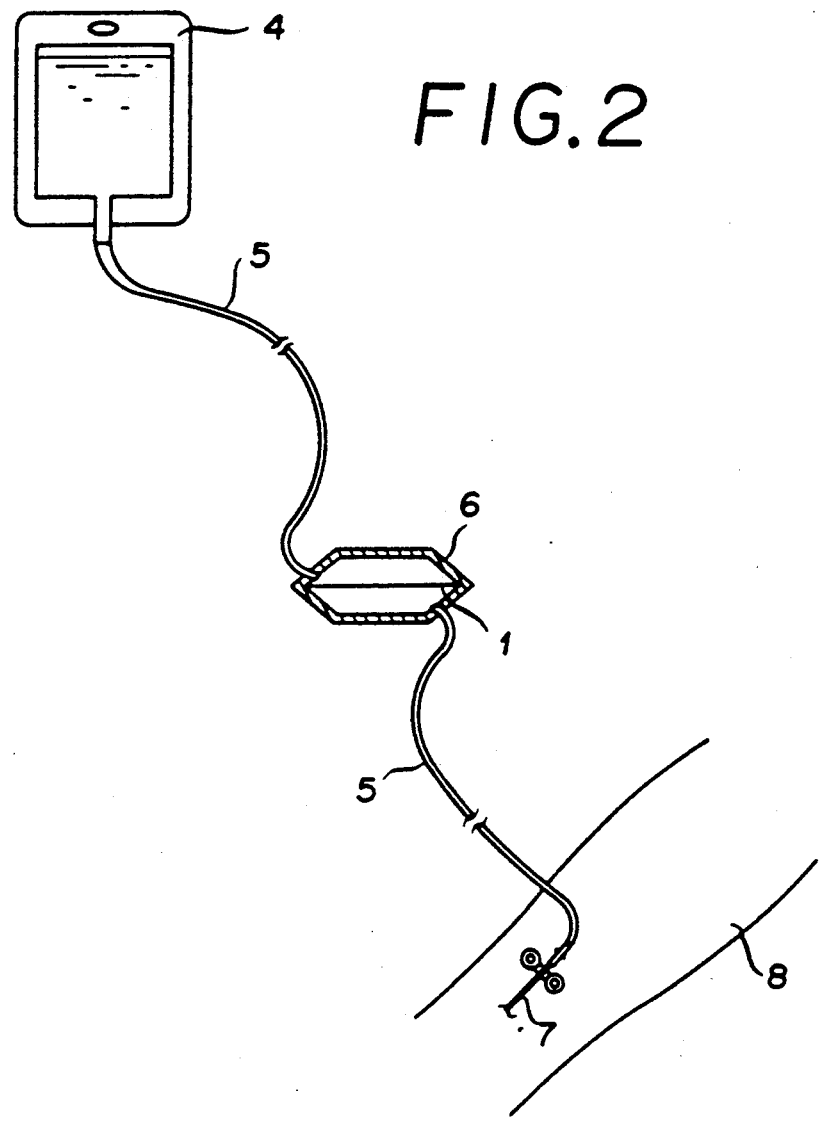
FIG. 2 is a diagram illustrating a typical manner in which a final filter for transfusion using a hydrophilic porous membrane of polyvinylidene fluoride of the present invention is put to use.

Now, the present invention will be described in detail below with reference to preferred embodiments. The term "hydrophilic porous membrane" as used in this specification refers to a porous membrane vested with such high hydrophilicity that water drops landing on one surface of the porous membrane are caused under their own weight to permeate through the interior of the porous membrane and even wet the other surface thereof.

The hydrophilic porous membrane of polyvinylidene fluoride of the present invention has been vested with uniform hydrophilicity by introduction of a polar group onto the molecule of polyvinylidene fluoride as a substrate through the chemical treatment of the substrate with an oxidizing agent. Moreover, since it is only the surface of pores in the membrane that has undergone the treatment for impartation of hydrophilicity, this membrane excels in ability to retain hydrophilicity very long and enjoys the highly desirable physical properties inherent in polyvinylidene fluoride. Thus, this hydrophilic porous membrane is excellent in resistance to chemicals and resistance to $\gamma$ ray. Then, the hydrophilic porous membrane of polyvinylidene fluoride of the present invention is characterized by the fact that the reflection spectrum thereof in the visible range of 370 to 700 $\mu$m is substantially unchanged from the reflection spectrum which existed before the treatment for impartation of hydrophilicity, namely, the reflection spectrum of the porous membrane of polyvinylidene fluoride as the substrate in its untreated state. Thus, the hydrophilic porous membrane of polyvinylidene fluoride is never inferior in outward appearance. These characteristic features may be logically explained by a supposition that no excess double bond is formed and the coloration of the membrane due to the double bond is precluded because the hydrophilic porous membrane of polyvinylidene fluoride of this invention acquires the hydrophilicity owing to the chemical treatment in a strong alkali solution containing an oxidizing agent as described fully later on and because the double bond once formed on the polyvinylidene fluoride in consequence of the removal of hydrofluoric acid by the action of the strong alkali is instantaneously oxidized and consequently caused to introduce therein a polar group when the oxidizing agent is allowed to manifest its action in the strong alkali solution.

As the polyvinylidene fluoride which forms the hydrophobic porous membrane as a substrate for the hydrophilic porous membrane of polyvinylidene fluoride of this invention, not only the homopolymer of vinylidene fluoride but also copolymers of vinylidene fluoride as a main component with other monomers such as ethylene tetrafluoride, methyl acrylate, methyl methacrylate, and propylene can be used.

The porous membrane of polyvinylidene fluoride can be prepared by any of the conventional methods. For example, it can be produced by a wet method which produces a porous membrane by dissolving the resin in a solvent, casting the resultant solution in the form of a membrane of stated shape, partially expelling the solvent from the membrane by evaporation, immersing the resultant membrane in a non-solvent miscible with a solvent thereby extracting the solvent from the membrane, and subsequently effecting thorough expulsion of the non-solvent and the residual solvent from the membrane by evaporation or by a dry method which produces a porous membrane by dissolving the resin from the beginning in a solvent and a non-solvent miscible with the solvent, casting the resultant solution in the form of a membrane of desired shape, and subsequently effecting thorough expulsion of the solvent and the non-solvent from the membrane by evaporation. Desirably, the porous membrane of polyvinylidene fluoride is produced with enhanced mechanical strength by adopting, as a solvent to be used during the course of the vapor wet process or the dry process, a mixture of a quick-drying solvent and a slow-drying solvent possessing different partial vapor pressures and, during the course of conversion of the solution into a gel, dissolving or swelling part of the resin with the aforementioned slow-drying solvent as disclosed in Japanese Patent Laid-Open SHO 49(1974)-126,572 and SHO 52(1977)-154,572. By above method, the porous membrane of hydrophobic polymer is produced in a form having a wall thickness generally in the range of 50 to 300 μm, preferably 100 to 200 μm, and an average pore diameter in the range of 0.1 to 1.0 μm, preferably 0.2 to 0.6 μm.

In the method of production according with the present invention, the membrane of hydrophobic polyvinylidene fluoride prepared as described above is first immersed in an aqueous type solvent so as to have the pores therein impregnated with the solvent.

The impregnation of the pores in the porous membrane of hydrophobic polyvinylidene fluoride with the aqueous type solvent can be effected by any of the conventional methods. For example, it can be accomplished by the method of organic solvent-water displacement or by the method which comprises first coating the membrane with a surfactant and subsequently immersing the coated membrane in the aqueous type solvent. the organic solvent-water displacement method is carried out by first immersing the porous membrane of polyvinylidene fluoride in an organic solvent such as ethanol or some other alcohol which is miscible with water, then sequentially displacing the solvent in the membrane with a series of organic solvent-water mixed solutions possessing a concentration gradient, and finally effecting thoroughly displacement of the remaining organic solvent with water.

The porous membrane of polyvinylidene fluoride which has the pores therein impregnated with the aqueous type solvent as described above is then subjected to a chemical treatment in a strong alkali solution containing an oxidizing agent to be vested with hydrophilicity.

In the method of production according with this invention, since the oxidizing agent is kept mixed in the strong alkali solution as described above, the double bond once formed within the molecule in consequence of removal of hydrofluoric acid by the action of the strong alkali on the surface of the porous membrane of polyvinylidene fluoride so immersed in the solution is immediately oxidized with the oxidizing agent and consequently enabled to introduce a polar group therein. Thus, the membrane is not suffered to form excessive double bond.

Examples of the strong alkali solution to be used advantageously in the method of this invention include alkali solutions containing such sodium alkoxides as sodium methoxide and sodium ethoxide and such potassium alkoxides as potassium methoxide, potassium ethoxide, and potassium isopropoxide. From the viewpoint of maintaining the physical properties of the porous membrane, preventing the membrane from coloration (due to excess progress of the chemical treatment in the direction of depth of the membrane), and preventing the solvent itself from oxidation with the contained oxidizing agent, the aforementioned strong alkali solution is desired to be an aqueous solution having potassium hydroxide or sodium hydroxide dissolved therein. The concentration of this alkali solution is approximately in the range of 10 to 60% by weight, 20 to 50% by weight.

As the oxidizing agent to be contained in the strong alkali solution for the purpose of the chemical treatment, various oxidizing agents such as inorganic oxidizing agents represented by chromates and permanganates and organic peroxides are usable. From the standpoint of economy and ease of operation, it is particularly desirable to use a permanganate, preferably potassium permanganate. Though the amount of the oxidizing agent to be added to the aforementioned strong alkali solution is variable with the kind of the oxidizing agent, it is approximately in the range of 1.0 to 15.0% by weight, preferably 3.0 to 7.0% by weight.

Optionally, the strong alkali solution containing the oxidizing agent may incorporate therein a catalyst, specifically an interlayer mobile catalyst such as, for example, t-butyl ammonium bromide.

In the method of production of the present invention, though the duration of the treatment in the strong alkali solution containing the oxidizing agent is variable with the concentrations of the oxidizing agent and the alkali compound and the temperature of the solution for the treatment and cannot be generally defined, 1 to 60 minutes', preferably 3 to 10 minutes' immersion of the membrane in the solution suffices for impartation of thorough hydrophilicity and brings about no impairment of the physical properties of the porous membrane of polyvinylidene fluoride. The temperature of the solution for the chemical treatment is approximately in the range of 20° to 100° C., preferably 60° to 90° C. in the hydrophilic porous membrane of polyvinylidene fluoride which is obtained as described above, only the porous surface portion of a substrate 2 made of a porous membrane of hydrophobic polyvinylidene fluoride has been converted into a hydrophilic layer 3 having a polar group uniformly introduced therein as illustrated with a model diagram in FIG. 1. Owing to this hydrophilic layer 3, the porous membrane exhibit highly desirable hydrophilicity and, at the same time, enjoys the excellent properties such as high resistance to chemicals and high resistance to γ ray which are inherent in polyvinylidene fluoride. Further, since the aforementioned porous membrane of polyvinylidene fluoride has no excess double bond, is not turned brown. Similarly to the porous membrane in the state not yet treated for impartation of hydrophilicity, the porous membrane resulting from the treatment assumes a white color or no color in its dry state. It, further, exhibits the same reflection spectrum in the visible range as that which existed before the treatment.

The hydrophilic porous membrane cf polyvinylidene fluoride of the present invention, owing to its excellence in resistance to chemicals, resistance to γ ray, previousness to water, efficiency of filtration, and mechanical strength, can be used in various fields. Main uses found therefor are as final filters for chemical solutions and solutions for transfusion, as filters for pharmaceutical manufacture, and as membranes for artificial organs such as artificial kidneys and plasma separators.

Now, the specific function fulfilled by the hydrophilic porous membrane of polyvinylidene fluoride of the present invention will be described below with reference to a case using the membrane as a final filter for transfusion.

The porous membrane of hydrophobic polyvinylidene fluoride thus obtained was immersed in an aqueous 70% ethanol solution, and then immersed in distilled water for displacement of the alcohol with water and impregnation of the pores in the membrane with water. Subsequently, the porous membrane was chemically treated by 5 minutes' immersion in an aqueous 40 wt% potassium hydroxide solution containing 3.0% by weight of potassium permanganese at 80° C. The membrane was removed from the aqueous solution and then washed with water and a sulfuric 2 wt% sodium hydrogen sulfite solution for removal of the treating solution and manganese dioxide adhering thereto. The porous membrane thus obtained as dried thoroughly in an oven (60° C. and 2 hours) and then immersed in water. As soon as the membrane entered the water, the water immediately permeated the pores in the membrane, indicating that the treatment had imparted thorough hydrophilicity to the membrane. Then, the membrane was dried again and immersed in water. When this cycle was repeated time and again, the membrane permitted immediate permeation of water even to the pores, indicating that the membrane had been vested with semi-permanent hydrophilicity and could be dried and used cyclicly.

Figure 3:
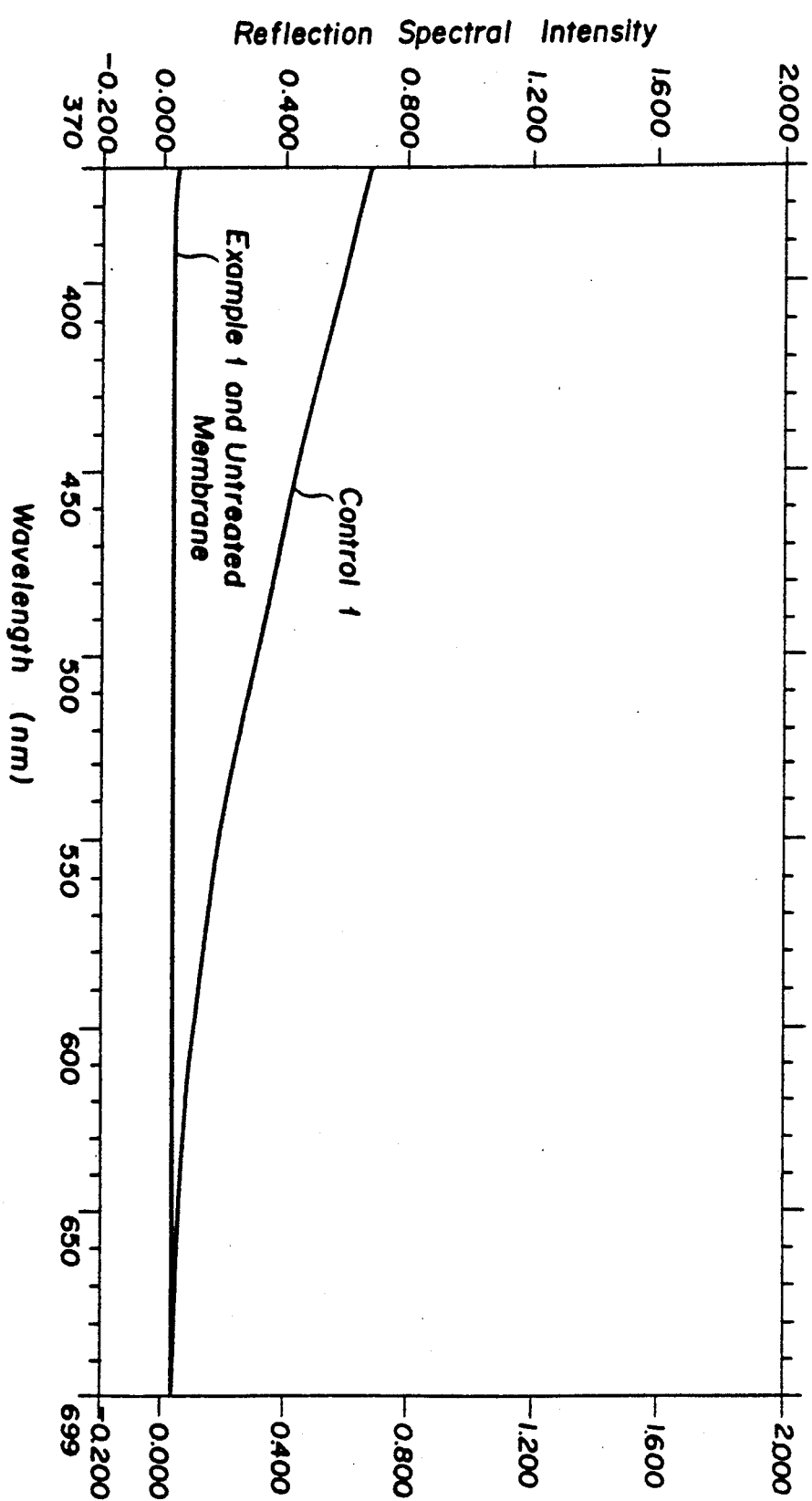
FIG. 3 is a chart of reflection spectra of various porous membranes.

The hydrophilic porous membrane of polyvinylidene fluoride thus obtained had the same white color as the porous membrane of hydrophobic polyvinylidene fluoride prior to the chemical treatment. When the reflection spectrum of the hydrophilic porous membrane of polyvinylidene fluoride in the visible zone of 370 to 700 nm was measured with a reflectance spectrophotometer (produced by Shimazu Seisakusho Ltd. and marketed under trademark designation of "TLC SCANNER CS 930"), there was obtained entirely the same spectrum pattern as from the porous membrane of hydrophobic polyvinylidene fluoride before the chemical treatment as shown in FIG. 3. Control 1

When the reflection spectrum of a commercially available hydrophilic porous membrane of polyvinylidene fluoride (produced by Millipore Corp. and marketed under trademark designation of 1pKG GVWP 29325, Lot No. C6E04877") in the visible zone of 370 to 700 nm was similarly measured, the absorption of spectrum in the low wavelength region was increased as shown in FIG. 3. The membrane itself was apparently colored in light brown.

Controls 2-4

Porous membranes of hydrophobic polyvinylidene fluoride were produced by following the procedure of Example 1, treated by the method of alcohol-water displacement for the pores in the membranes to be impregnated with water, and subjected to the chemical treatment under varying conditions indicated in Table 1, desired hydrophilic porous membranes of polyvinylidene fluoride were not obtained because their physical properties were impaired to a point where they could no longer withstand their intended uses, because they were colored (in light brown), or because the impartation of hydrophilicity failed to proceed to the pores in the membrane. Control 5

When a porous membrane of polypropylene (150 μm in wall thickness and 0.45 μm in average pore diameter) was treated by following the procedure of Example 1, no impartation of hydrophilicity to the membrane was obtained.

TABLE 1

|  | Treatment Condition | | | Impartation of hydrophilicity | Coloration (visible) |
|---|---|---|---|---|---|
|  | Solution for treatment | Time (min.) | Temperature (°C.) | | |
| Example 1 | 3.0% KMnO4<br>40% KOH | 5 | 80 | ○ | None |
| Control 2 | 40% KOH<br>↓<br>3.0% KMnO4<br>15% KOH4 | 5<br><br>2 | 80<br><br>40 | X | Colored |
| Control 3 | 40% KOH<br>↓<br>3.0% KMnO4<br>15% H2S04 | 8<br><br>2 | 70<br><br>40 | X | Colored |
| Control 4 | 40% KOH<br>↓<br>3.0% KMnO4<br>15% H2SO4 | 8<br><br>2 | 70<br><br>40 | X | Colored |

INDUSTRIAL APPLICABILITY

The hydrophilic porous membrane of polyvinylidene fluoride of this invention has hydrophilicity uniformly imparted to the surface of pores in the porous membrane of polyvinylidene fluoride and is characterized by the fact that the reflection spectrum of the membrane in the visible zone is substantially unchanged from that which the membrane exhibited before it underwent the treatment for the impartation of hydrophilicity as described above. Thus, the membrane assumes no color or a white color similarly to the porous membrane of polyvinylidene fluoride used as a substrate and ,enjoys a very high commercial value. It possesses semipermanent hydrophilicity because the hydrophilicity is vested by the introduction of a polar group only to the surface of pores in the membrane. At the same time, it enjoys the outstanding properties inherent in the porous membrane of polyvinylidene fluoride as a substrate and, therefore, exhibits highly desirable resistance to chemicals and resistance to γ ray and high safety. thus, the membrane is expected to find extensive utility in numerous applications to medical devices such as final filters for transfusion liquids and medicinal solutions, plasma separation membranes, blood purification membranes, various industrial devices such as filters for removal of bacteria, various separation membranes, and substrates for immobilization of particulate substances, and devices for physicochemical researches.

The method of this invention for the production of a hydrophilic membrane of polyvinylidene fluoride is characterized by preparing a porous membrane of polyvinylidene fluoride, immersing the porous membrane in an aqueous type solvent thereby enabling the pores in the membrane to be impregnated with the solvent, and subjecting the resultant wet membrane to a chemical treatment in a strongly alkali solution containing an oxidizing agent. The double bond once formed on the molecular of polyvinylidene fluoride by the action of the strong alkali is instantaneously oxidized by the action of the oxidizing agent mixed in the strong alkali solution to effect introduction of the polar group and has no possibility of entailing formation of excess double bond. Thus, the hydrophilic porous membrane of polyvinylidene fluoride possessing outstanding properties and enjoying high commercial value as described above can be produced by a simple procedure quickly and with high operational efficiency. The production proves to be inexpensive in terms of equipment and cost. Further, in the method of production according with this invention, when potassium permanganate is used as an oxidizing agent and an aqueous solution obtained by dissolving potassium hydroxide or sodium hydroxide is used as a strong alkali solution, the hydrophilic porous membrane of polyvinylidene fluoride of still better performance can be obtained easily at a low cost.

What is claimed is:

1. A method for the production of hydrophilic porous membrane of polyvinylidene fluoride, comprising forming a porous membrane of polyvinylidene fluoride, impregnating an aqueous type solvent into the pores of said porous membrane, and subjecting the impregnated porous membrane to a chemical treatment in a strong alkali solution containing an oxidizing agent.

2. A method according to claim 1, wherein said oxidizing agent is potassium permanganate.

3. A method according to claim 1 or claim 2, wherein said strong alkali solution is an aqueous solution having potassium hydroxide or sodium hydroxide dissolved therein.

4. A method according to claim 1, wherein the concentration of said strong alkali solution is approximately 10 to b 60% by weight.

5. A method according to claim 4, wherein the amount of said oxidizing agent in said strong alkali solution is approximately 1.0 to 15.0% by weight.

6. A method according to claim 1, wherein said impregnation is carried out for 1 to 60 minutes.

7. A method according to claim 6, wherein the temperature of said strong alkali solution is 20° C. to 100° C.

* * * * *